United States Patent [19]

Doll

[11] 4,375,243

[45] Mar. 1, 1983

[54] WIDE RANGE HIGH ACCURACY WEIGHING AND COUNTING SCALE

[76] Inventor: W. Gary Doll, 384 Keenan Ave., Fort Myers, Fla. 33907

[21] Appl. No.: 249,081

[22] Filed: Mar. 30, 1981

[51] Int. Cl.³ .......................................... G01G 19/04
[52] U.S. Cl. .................................... 177/25; 177/164; 177/206; 177/211
[58] Field of Search ................... 177/25, 164, 200, 211

[56] References Cited

U.S. PATENT DOCUMENTS

| | | | |
|---|---|---|---|
| 3,700,055 | 10/1972 | Gaulier | 177/164 X |
| 3,994,161 | 11/1976 | Trozera | 177/211 X |
| 4,219,089 | 8/1980 | Gard et al. | 177/200 X |
| 4,307,787 | 12/1981 | Raboud et al. | 177/211 X |

*Primary Examiner*—George H. Miller, Jr.
*Attorney, Agent, or Firm*—Duckworth, Allen, Dyer & Pettis

[57] ABSTRACT

An electronic scale is provided with two or more load cells in which the first load cell covers a low load range, and each successive cell covers a greater load range than the preceding cell. The cells are connected mechanically in tandem such that a load on the scales is applied to each cell simultaneously. Electrical signals from each load cell when performing a weighing operation are processed by a microcomputer to digitize the signals and to select the signal coming from the first load cell in the tandem connection which is not overloaded. The microprocessor scales the measurement signal and displays the weight on an alphanumeric readout. Memory circuits are included for storing tare weights and for storing unit weights during counting operations. When a number of units in a group is to be counted, the microprocessor divides a measured weight by the unit weight and outputs the count to the alphanumeric readout display. A low profile of the tandem load cell arrangement is obtained by the use of Z-brackets or L-brackets to provide the mechanical interconnections. All switching of ranges is done automatically by the microprocessor without attention of the user.

14 Claims, 6 Drawing Figures

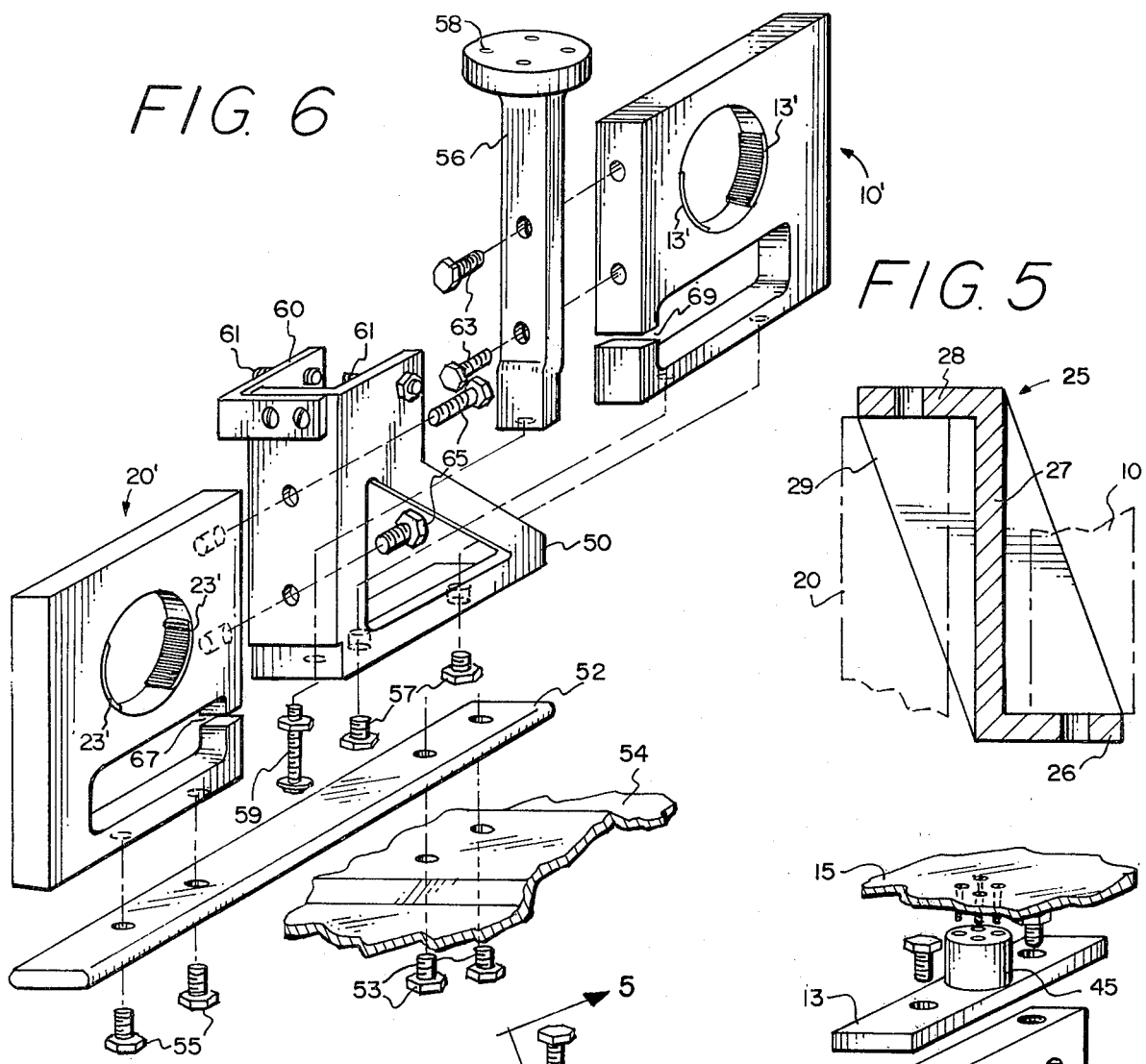
FIG. 6
FIG. 5
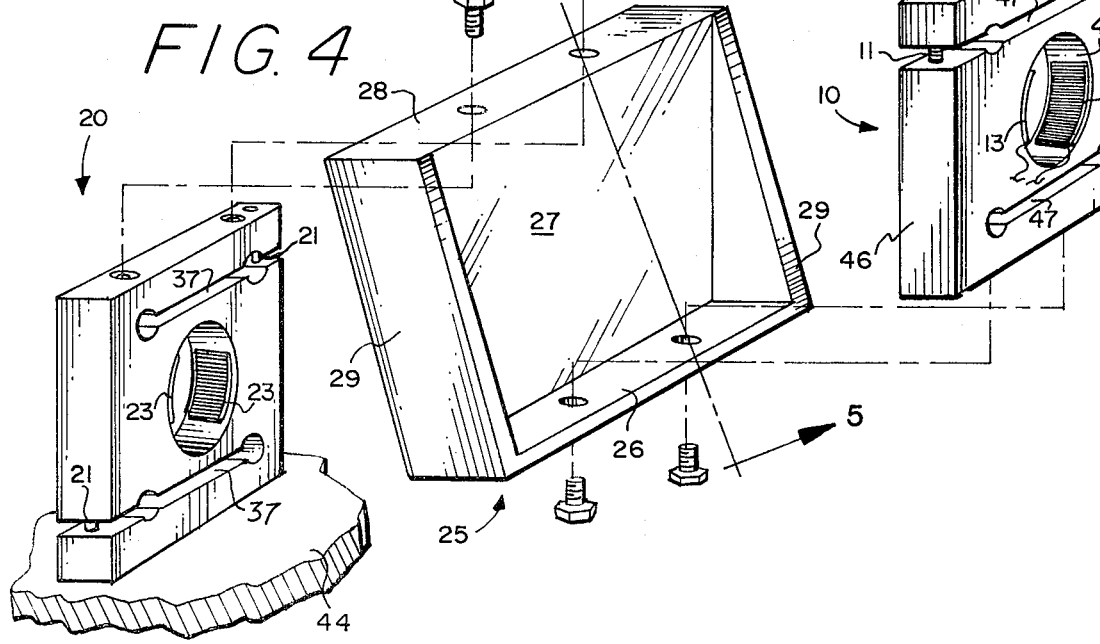
FIG. 4

WIDE RANGE HIGH ACCURACY WEIGHING AND COUNTING SCALE

BACKGROUND OF THE INVENTION

1. Field of the Invention

The present invention relates to a dual range scale for weighing and counting of articles, and more particularly to dual range load cells utilizing two tandem connected load cells in which one cell covers a low range of weights and a second cell covers a high range of weights.

2. Background of the Invention

In weighing and counting scales, it is common to have a requirement for high accuracy over a very wide range of weights. For example, in inventorying parts, there may be a large number of light weight units, but having a large gross weight, followed thereafter by a relatively small number of lightweight objects in which resolution must be made at the lower end of the scale. Thus, there is a requirement for a counting type scale which will provide very high accuracy for light weights and low counts as well as for high counts and heavy weights. It is common, in scales of this type, to utilize load cells such that processing of the signals produced can be done electronically. A low range load cell for use with lighter weights may be used in one instance, and a high range load cell for a heavier weight in another instance.

It has also been known to join individual cells in tandem. For example, in U.S. Pat. No. 3,120,754 to Lebow, two load cells are shown in tandem and arranged with mechanical stops to permit overloading of the low range cell without damage when the weight exceeds its range, reload is then operative on a second, higher range load cell. This disclosure teaches cells arranged end to end for use in tension. U.S. Pat. No. 3,464,508 to Engle et. al., illustrates the use of multiple cells; however, the cells are basically in parallel for measuring a distributed load by summing the outputs from each cell. It is also desirable in multiple cell type scales for the load capacity switching to be done automatically without the attention of the operator. One such electrical scale changing system is shown in the U.S. Pat. No. 3,437,160 to Hill, which utilizes a complex servo system for that purpose.

There is a need for a wide range scale system which will have high sensitivity at low weights or counts, which will be of a compact design, and in which switching of scales is performed electronically without attention of the operator.

SUMMARY OF THE INVENTION

The present invention is a multiple range scale suitable for both weighing and counting in which a first load cell having a low range, for example 0 to 5 pounds, is connected in tandem with a high range load cell, which may be for example from 0 to 25 pounds, and having a microcomputer for processing of the signals from the load cells. Advantageously, a novel mounting bracket is provided to couple the two load cells together in a side-by-side fashion, rather than end-to-end to therefore provide a low profile of the load cell arrangement. The load cell produce signals representative of the load on the cells and the signals are processed in analog form and then converted to digital counts. The digital count signals are then input to a suitable computer programmed to determine either the weight placed on the scale or the number of units placed on the scale and to operate alphanumeric displays as well as printouts of the results. The user calibrates the scale initially for a tare weight which is stored in the microcomputer memory. For counting purposes, the user also calibrates the system to store the unit weight in the computer memory.

Automatic switching when the maximum capacity of the first load cell is exceeded is accomplished electronically by providing a prescribed maximum number of counts for the low range load cell which, if exceeded, causes the microprocessor to accept the counts from the high range load cell. The microprocessor also subtracts the count representative of the tare weight and, when required, divides the total measured weight by the unit weight to provide a unit count. Although described above as a dual range scale, it will be obvious that more than two load cells may be coupled in accordance with the invention.

It is therefore a primary object of the invention to provide a weighing and counting scale having a wide range capacity with increased resolution and accuracy for the low range portion of the scale.

It is another object of the invention to provide a weighing and counting scale having a dual range in which the range switching is done automatically without action on the part of the user.

It is yet another object of the invention to provide a weighing and counting scale having a microcomputer control to permit the user to easily and quickly calibrate the scale for tare weights and for unit weights when utilized in the counting mode.

It is still another object of the invention to provide a mounting means for connecting load cells of different sensitivities in tandem such that no damage occurs to the more sensitive load cell when overloaded and such that the weight will be transferred to the high capacity cell in such case.

It is a further object of the invention to provide means for tandem connections of load cells having a minimum overall height so as to permit a compact scale to be produced.

These and other objects and advantages of the invention will be become apparent from the following detailed description when read in conjunction with the drawings.

BRIEF DESCRIPTION OF THE DRAWINGS

FIG. 4 is an exploded view of the Z-mount bracket for coupling two Lebow load cells;

FIG. 5 is a cross-sectional view of the Z-bracket of FIG. 4 through the plane 5—5; and FIG. 6 is an exploded view of the L-bracket for mounting two Sensortronic load cells in tandem.

DETAILED DESCRIPTION OF THE PREFERRED EMBODIMENT

Figure 1:
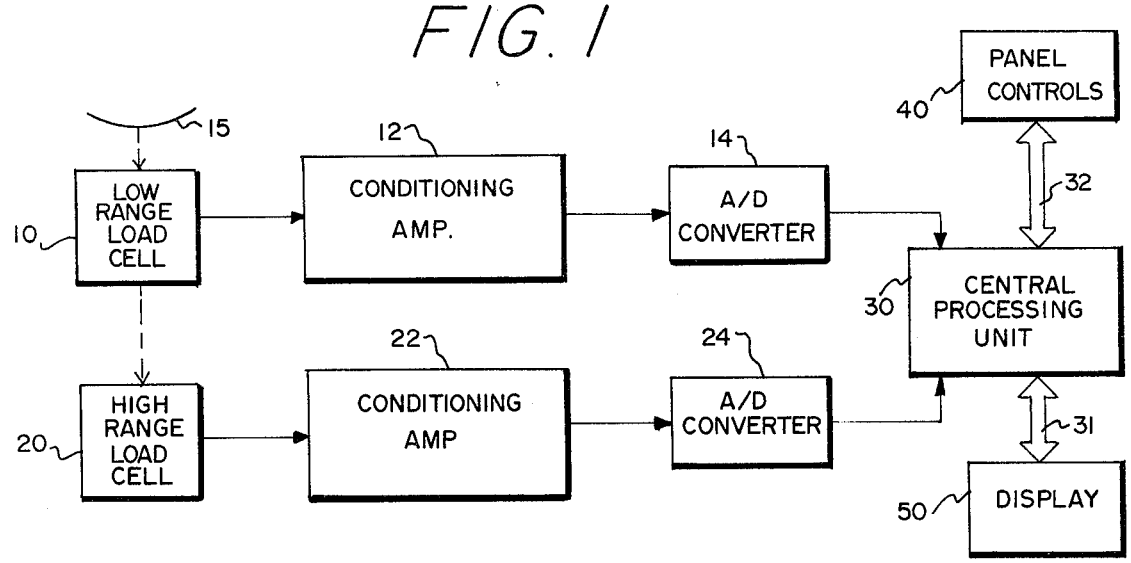
FIG. 1 is a block diagram of the counting and weighing scale of the invention.

The invention is an electronic scale covering a wider range than prior art single platform counting and weighing scales, and having comparable sensitivity for each portion of the scale range. Referring to FIG. 1, a block diagram of one implementation of the invention is shown. This implementation illustrates the use of two load cells with low range load cell 10 providing high sensitivity for small loads, connected in tandem with high range load cell 20 having several times the capacity of load cell 10 to weigh heavier materials. As indicated, weighing platform 15 is operative on low range load cell 10 and high range load cell 20 in tandem. As will be described, switching from load cell 10 to load cell 20 is fully automatic. The scale of the invention is used for either determining the weight of a load or for counting, with a high degree of accuracy, the number of parts on the platform 15. The latter mode is provided by first calculating the weight of a single or a known quantity of parts, storing this information, and thereafter calculating the number of parts from the bulk weight. The tare weight due to containers, and the like, may also be stored and taken into account during the counting or weighing operation.

Although FIG. 1 indicates a pair of tandem load cells, it is possible to extend the range of the scale further by coupling to a third load cell with additional electronic circuitry.

Load cells 10 and 20 may be of the strain gauge type wherein a strain gauge whose resistance varies with the strain on a member to which it is attached. Associated circuitry measures such variation in resistance to produce an electrical signal proportional to the strain. Commercially available load cells operating on this principle are available as will be discused below. The electrical signal generated by load cell 10 is applied to a linear conditioning amplifier 12 which amplifiers the signal, filters it to eliminate noise, and applies a signal to an analog/digital (A/D) converter 14 which produces a linear count defined by a binary code. In the preferred embodiment, a maximum count of 100,000 is utilized. Similarly, load cell 20 drives conditioning amplifier 22 which provides a signal to A/D converter 24 which also produces a maximum 100,000 count output. A central processor unit 30 (CPU) processes the signals from A/D converters 14 and 24, converts the raw digital counts to either a weight or number of parts expressed in appropriate digital words. Panel controls 40, connected to CPU 30 by bus 32, permit the user to select the mode of operation and to perform the various standardizing operations, storing of tare weights, storing of part unit weights, and similar operations. Display 50, connected to central processing unit 30 by bus 31, displays the weight, count, or other information as selected by panel controls 40. A preferred display is an alphanumeric read-out devices, such as light emitting diodes (LED) or a liquid crystal display (LCD). Display 50 may also be connected to a printer (not shown) to provide permanent records of each weighing.

Figure 2:
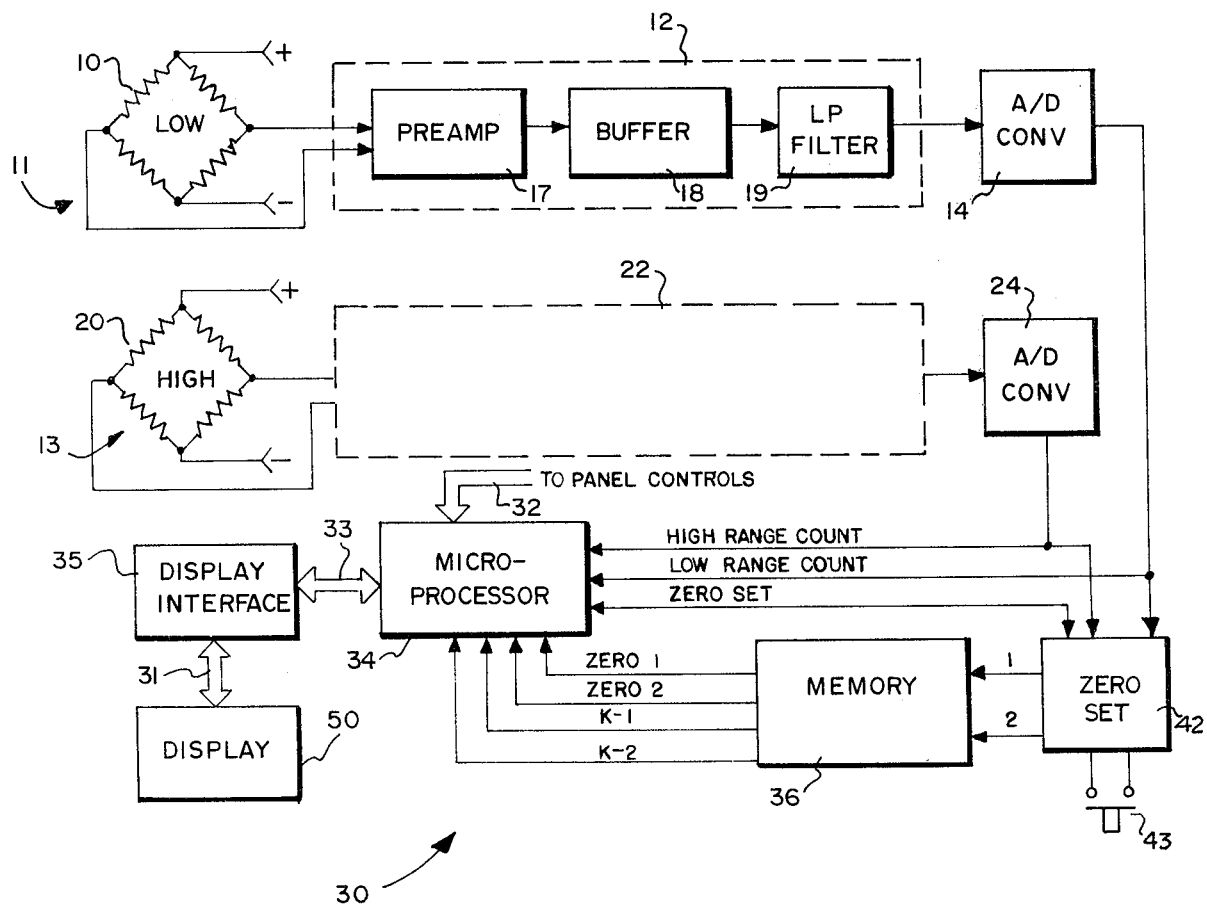
FIG. 2 is a more detailed block diagram of the system of FIG. 1 showing the signal processing and details of the computer circuits.

Turning now to FIG. 2, additional details of the system of FIG. 1 will be given and the method of automatic switching of load cell 10 to load cell 20 will be described. Load cells 10 and 20 include strain gages connected in wheatstone bridge circuits 11, 13 in which strain gauges vary in resistance in proportion to the weight of the material on platform 15. Referring first to bridge 11, excitation is applied thereto. The output leads connect to preamplifier 17 in a differential connection. Preamplifier 17 is an instrumentation type amplifier having high common mode rejection, as well as low noise characteristics. Preamp 17 drives buffer 18 and low pass filter 19. Low pass filter 19 may have a cut-off frequency of about 2 Hz to minimize the noise in the output signal. Conditioning amplifiers 12, 22 conveniently may be provided by 2B31L module available from Analog Devices. A/D converter 14 which receives the signal from low pass filter 19 may be a 7104 available from Intersil, having a ±16 bit capacity with a maximum count capability of 132,000.

The electrical characteristics of load cell 20 are identical to those load of cell 10 with conditioning amplifier 22 and A/D converter 24, being identical with the corresponding elements associated with load cell 10. The mechanical structure to which the strain gauges are attached in load cell 20 will handle a greater range of weight than that of load cell 10, as will be shown in more detail later.

Elements of CPU 30 are shown, which include a memory section 32, computer 34 and display bus 36. When a user desires to operate the scale, it is necessary to set the zero point for each load cell 10 and 20 by a panel control indicated functionally by push button 43. The user places an empty container on the scale pan 15 and depresses push button 43. A count, known as the zero count, will then occur at the output of A/D converter 14 and A/D converter 24 according to the weight of the container. Computer 34 will cause the zero count from each load cell 10 and 20 to be transferred by zero set circuit 42 to memory 36 to be stored. Computer 34 will subtract the stored zero count from each count it later receives from A/D converter 14 on the low range count lead and will perform the same operation with respect to the high range zero count and the incoming high range count on that lead. Thus, with an empty container on the weighing platform 15, the computer will see a resulting zero count.

Assume, for exemplary purposes, that load cell 10 has a maximum capacity of five pounds and that load cell 20 has a maximum capacity of twenty-five pounds. Assume that the container for which the system of FIG. 2 has been zeroed, is partially filled with a bulk material to be weighed and that an initial weighing of less than five pounds is to be made. With the container loaded, the strain gauge in load cell 10 will have a greater change than the strain gauge in load cell 20. Therefore, the low range count will be larger than the high range count. The count on the low range count lead will be less than 100,000 counts, which corresponds to the maximum load of five pounds on load cell 10. Computer 34 will then subtract the low range zero count from the incoming count on the low range count lead and will determine that the raw count is less than 100,000 indicating that the weighing should be done by low range load cell 10. It should be noted that the high range load cell 20 will also be producing a signal proportional to the weight on the platform; however, a higher accuracy will be obtained from load cell 10 because of its higher sensitivity. Thus, the microprocessor 34 will ignore the count from load cell 20. Next, the microprocessor 34 will multiple the raw count obtained from load cell 10 by a constant $K_1$ which may be stored in memory 36. Constant $K_1$ is a parameter of load cell 10 which defines the weight per count. Thus, this operation produces a measurement of the weight on the platform 15. If the operator had requested a readout in weight from control panel 40, then the output of microprocessor 34 will indicate on display 50 via interface 35 the weight in pounds or other selected units.

Assuming next that more than five pounds of material is placed in the container, for example 15 pounds, and cell 10 would have its capacity exceeded. Mechanical stops provided in load cell 10 prevent any damage to the load cell from an overload. In addition, the raw count produced by A/D converter 14 would exceed 100,000 and may be electronically limited to say 125,000. Microprocessor 34 will note that the low range count exceeds 100,000 counts and would automatically disregard that count and switch to the high range count from load cell 20. The raw count obtained by subtraction of the zero count from the high range count will then be multiplied in microprocessor 34 by $K_2$, the count/weight constant for load cell 20 to produce a reading of "15". Therefore, microprocessor 34 will instruct display 50 to show 15 pounds.

In the event that a user desired to count the number of articles placed in a container, he would first calibrate the low range zero count and high range zero count for the tare weight of the container as previously described. Next, the operator would place one or a selected number of units in the container and enter that number via the panel controls 40 along with an entry indicating that a parts count rather than a weight is required. The microprocessor 34 will receive digital information from panel controls 40 indicating the number of units in the container and the instruction to provide a count of units. Therefore, the microprocessor 34 will store in its memory 36, the base count from load cell 10 which has the greater sensitivity. After this calibrating operation, the operator sets panel controls 40 to the count mode and thereafter, when a large number of units is placed in the container, microprocessor 34 will determine the raw count for that number and divide by the stored base count for the known calibrating number, thereby producing the desired total count which will be displayed by display 50. Again, microprocessor 34 will accept the raw count from either load cell 10 or load cell 20, dependent upon which count indicates the larger number.

Figure 3:
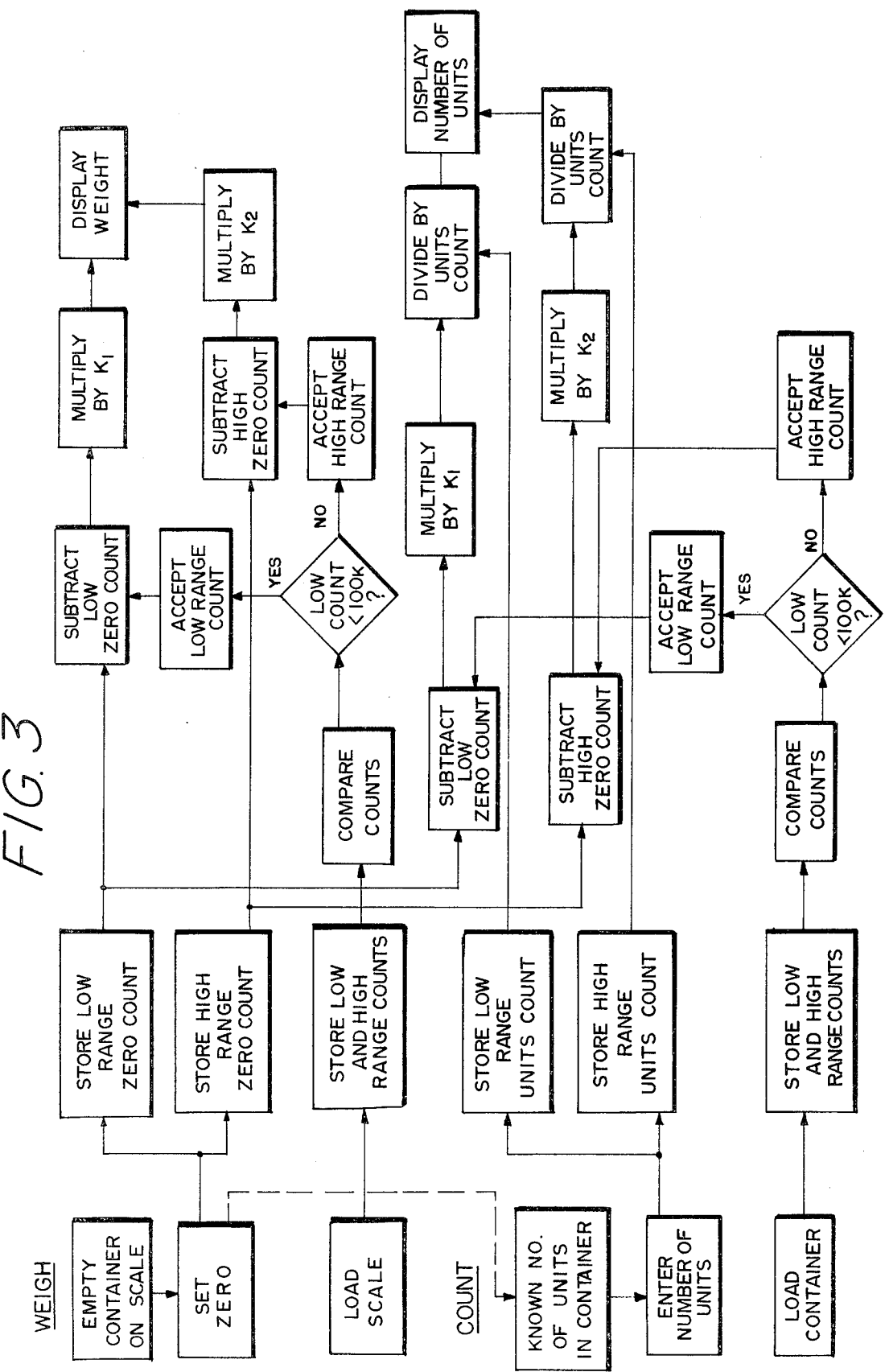
FIG. 3 is a flow diagram showing the operation of the scale of the invention for various applications.

Referring to FIG. 3, a simplified flow diagram for the weighing and counting operations is shown. Along the left side of the diagram are the operations performed by the user. For example, the user places an empty container on the scale and sets the panel controls for calibrating the zero count at which time the computer stores the low range zero count and high range zero count as previously described. For a weighing operation, the user then places the units to be weighed in the empty container and enters the weigh requirement on the control panel. Once the microprocessor selects the high or low range, the stored zero count is subtracted, and the raw count then is corrected by the constant, and the weight is displayed. To utilize the scale for counting, and after the zero set operation is completed, the user places a known number of units in the container and enters that number into the control panel. The user then enters a count instruction into the control panel and the microprocessor then stores the raw counts from the low range and high range channels. The user fills the container with the bulk units to be counted and enters the requirement for counting into the control panel. The microprocessor selects again either the high or low range raw count, substracts the zero count, multiplies by the constant to determine the weight and then divides by the weight per unit and displays the number of units.

An important element of the invention is a novel load cell mount that effectively connects load cell 10 and load cell 20 in tandem in a minimum of space. Turning to FIG. 4, an exploded view of the mounting is shown.

The main mounting bracket 25, termed a Z-bracket, is shown in FIG. 5 in cross-ection through plane 5—5 of FIG. 4. Upper flange 28 is offset from lower flange 26 and the flanges are connected by web 27 and end flange 29 with load cell 10 mounted to lower flange 26 and load cell 20 mounted to upper flange 28. Load cell 20 is attached to the base plate 44 of the scale while the weighing pan 15 is attached to load cell 10 by means of a load spacer block 45 and a top bar 13. As may be recognized, Z-bracket 25 permits a minimum height or distance between base plate 44 and weighing pan 15. The diagonal end plates 29 add rigidity to the Z-bracket to minimize any off-axis load on the cells. Load cells 10 and 20 are a type manufactured by Lebow and are available in various load ranges. For example, load cell 10 may be for a maximum load of five pounds and load cell 20 for a maximum of 25 pounds. A typical load cell, such as load cell 10, is fabricated from a instrumentation grade metal block 46 having slots 47 cut at the upper and lower ends as shown. An opening is cut through the block and a pair of strain gauges 13 is affixed to opposite sides of the opening. When a load is placed on the top of block 46, it may be seen that the slots 47 would tend to be squeezed together producing a diagonal strain across the center portion of block 46 having the opening 48 therein. This strain will slightly warp strain gauges 13 causing their resistance to change in accordance with their characteristics. The maximum range of a cell such as cell 10 will be controlled by the type of material and the cross-sectional areas of the various portions. To limit the deflection of the upper and lower portions of the body 46, mechanical stops 11 may be provided in the slots 47, such as a set screw, which can be adjusted to stop any further movement at a desired load. Although not shown, tension stops may also be provided for use when the load cell might be utilized to measure tension, or in the case of the scale, to prevent damage if the scale were to be lifted by the platform.

Load cell 20 is bolted to the base plate 44 and the load on platform 15 will be transferred to cell 20 via Z-bracket 27. The weight will also cause gaps 37 in load cell 20 to close. However, since load cell 20 is designed for much heavier loads than load cell 10, it may be seen that the gaps 47 in load cell 10 will first close to a point that stops 11 will prevent any further action of load cell 10. The gaps 37 on load cell 20 will then continue to close as weight is increased until stopped by stops 21 which will prevent any further loads from damaging load cell 20.

While the description above involves a mount for the Lebow cells, the invention may also utilize cells of a slightly different configuration which are available from Sensortronic. Two Sensortronic cells may be coupled together by the L-bracket shown in FIG. 6. As an example, a low range cell 10' which may be five pounds maximum is shown coupled to load cell 20' which may have a 25 pound maximum load. Load cells 10' and 20' are coupled by their edges through the use of L-bracket 50 arranged so that the distance from the base to the top of the platform is minimized as in the embodiment using the Z-bracket. The Sensortronic cells have a single gap 69 and 67 as indicated, which also act as mechanical stops. A pedestal bracket 56 is attached to the edge of cell 10' by bolts 63. The top of bracket pedestal 56 includes threaded holes 58 for mounting to the scale cradle and weighing pan. The bottom edge of cell 10' bolts to the bottom of bracket 50 by bolts 57. Due to the relatively narrow body of cell 10', L-bracket 50 includes an angle bracket 60 and adjustable side stops 61 which will prevent offcenter loads from distorting load cell 10'. The vertical portion of L-bracket 50 is bolted to the edge of high range load cell 20' which has a bottom edge attached to a mounting blade 52 by bolts 55. The base 54 of the scale unit includes a slightly raised portion permitting mounting blade 52 to be attached to the base 54 by bolts 53. A tension stop screw 59 passes through a clearance hole in the bottom portion of L-bracket 50 and threads into the lower end of pedestal bracket 56. Screw 59 is adjusted to act as a tension stop in the event that the scale were lifted by its cradle.

As in the embodiment of FIG. 4, light weights placed on the scale pan will cause low range load cell 10' to produce distortion of its strain gauges 13' to the point at which its maximum is reached at which time no further distortion will occur due to closing of gap 69. At this load, gap 67 of high range load cell 20' is beginning to close and will continue until its maximum load capacity is exceeded as additional weight is added. This produces additional strain in strain gauges 23' to the point that gap 67 becomes closed. It may be noted that the heads of bolts 55 will contact base 54 to prevent distortion of the load cell system if the maximum limit of the load cells were exceeded.

As may now be recognized, a wide range weighing and counting scale has been presented having as a key feature, the use of a highly sensitive first load cell connected mechanically to a second lower sensitivity, higher range load cell. Novel coupling brackets for each of two manufacturers' load cell types have been disclosed which permit the dual load cell arrangement without significantly increasing the height of the scale unit and which permit maximum sensitivity and accuracy over the full weighing or counting range of the device. Advantageously, the use of load cells which will produce electrical signals representative of the loads on the scale permits the use of a microprocessor to process the generated signals, to provide the required calculations to produce output signals to a visual display, and which can be programmed to read weights or numbers of units. The electronic circuits are also easily calibrated by the user to account for tare weights and to store unit weights for counting purposes. Although certain specific implementations have been illustrated, it is to be understood that these are for exemplary purposes only, and many changes or modifications may be made by those skilled in the art without departing from the spirit or scope of the invention. For example, three or more load cells may be coupled using the disclosed brackets.

I claim:

1. A wide range weighing and counting scale comprising:
    (a) a first load cell having a first range of operation, and a second load cell having a range of operation higher than said first load cell, said second load cell mechanically coupled in tandem with said first low range cell;
    (b) first conditioning amplifier means connected to said first load cell to receive electrical signals therefrom for producing a digital count proportional to the load applied to said first load cell, said amplifier having a preselected upper count limit;
    (c) second conditioning amplifier means connected to said second load cell to receive electrical signals therefrom for producing a digital count proportional to the load on said second load cell; and
    (d) computer means connected to said first and second conditioning amplifiers, said computer means for selecting the digital count for processing from said first conditioning amplifier when said count is less than a preselected upper limit, and for selecting the digital count from said second conditioning amplifier when said first count is greater than said selected upper limit, said computer means for calculating a number representative of the load on said scale from the selected digital count; and
    (e) display means for displaying said calculated number.

2. The wide range weighing and counting scale recited in claim 1 in which said calculated number is the weight of the load on said coupled first and second load cells.

3. The wide range weighing and counting scale recited in claim 1 in which said calculated number is the number of units forming the load on said coupled first and second load cells.

4. The scale as defined in claim 1 in which said scale includes:
    (a) a base plate;
    (b) said mechanically coupled load cells include said second load cell bolted to said base along a bottom surface of said cell;
    (c) a Z-bracket having an upper flange and a lower flange, said upper flange bolted to the top surface of said second load cell;
    (d) said first load cell bolted to said lower flange of said Z-bracket along the bottom surface of said first cell; and
    (e) a weighing platform bolted to the top surface of said first load cell; whereby the force from a material to be weighed placed in said weighing platform is transmitted to said first load cell directly and to said second load cell via said Z-bracket.

5. The scale defined in claim 1 in which:
    (a) said scale includes a base plate;
    (b) said mechanically coupled load cells include said second load cell bolted to said base plate along a bottom surface of said cell;
    (c) an L-bracket having a vertical flange and a lower horizontal flange, said vertical flange bolted to a vertical surface of said second load cell;
    (d) said first load cell bolted to said horizontal lower flange of said L-bracket;
    (e) a weighing platform pedestal bracket bolted to the vertical side surface of said first load cell adjacent to said vertical flange; and
    (f) a weighing platform attached to the upper end of said pedestal bracket; whereby a weight placed on said weighing platform is transferred to said first load cell via said pedestal bracket, and to said second load cell via said L-bracket.

6. The wide range weighing and counting scale recited in claim 1 in which said first and second conditioning amplifiers each includes:
    (a) a preamplifier having low noise characteristics;
    (b) a buffer amplifier;
    (c) a low pass filter; and
    (d) an analog-to-digital converter.

7. The wide range weighing and counting scale recited in claim 6 which said computer means includes:
    (a) a microprocessor connected to said analog-to-digital converters;
    (b) a memory connected to said microprocessor; and (c) said display means includes display interface and alphanumeric displays.

8. The wide range weighing and counting scale recited in claim 6 in which said scale includes said analog-to-digital converters to convert analog signals from said load cells to binary counts, said counts limited to said selected upper limit.

9. An electronic counting scale for determining the number of units in a group of units, said scale having a high count accuracy over a wide range of weights of said units comprising:
(a) memory means for temporarily storing the unit weight of objects to be counted;
(b) a base;
(c) a platform for holding the group of units to be counted;
(d) a multiplicity of load cells mechanically and operatively connected in tandem between said platform and said base, wherein each successive load cell after a first load cell has a greater weight capacity than the preceding load cell;
(e) a multiplicity of electronic amplifier means for providing excitation to each of said load cells, for receiving analog electrical signals therefrom representative of the weight of a group of units on said platform, and for amplifying each of said signals;
(f) means for selecting the amplified signal from the load cell in tandem connection having the highest value and for which the weight capacity of such load cell is not exceeded;
(g) means for converting said selected signal to a weight measurement signal;
(h) means connected to said memory means for dividing said weight measurement signal by said temporarily stored unit weight to thereby produce an electrical count signal representative of the number of units in said group; and
(i) electronic display means for displaying the count of said group.

10. The scale as defined in claim 9 in which said mechanical connection between said multiplicity of load cells is by means of a Z-bracket arranged to minimize the overall height of said multiplicity of load cells.

11. The scale as defined in claim 9 in which each of said multiplicity of load cells includes a mechanical stop to prevent damage to a load cell when its weight capacity is exceeded.

12. The scale as defined in claim 9 in which said electronic amplifier means includes:
(a) a source of DC excitation voltage;
(b) a low noise amplifier;
(c) a low pass filter connected to said low noise amplifier; and
(d) analog-to-digital converter connected to receive analog signals from said low pass filter and to produce a digital count representative of the amplitude of such analog signals.

13. The scale as defined in claim 12 in which said selection means includes:
(a) means for limiting the maximum value of the digital count from each of said analog-to-digital converters to a preselected value representative of the maximum load of each of said load cells; and
(b) microprocessor for comparing two successive digital counts resulting from the load on each successive load cell and selecting the first digital count which does not exceed said preselected maximum count value.

14. The scale as defined in claim 13 in which:
(a) said microprocessor multiplies said selected digital count by a predetermined constant for the selected load cell, and said weight measurement signal is an alphanumeric code; and
(b) said electronic display means is an alphanumeric readout responsive to said alphanumeric codes.

* * * * *